(12) United States Patent
Qi et al.

(10) Patent No.: US 12,348,830 B2
(45) Date of Patent: Jul. 1, 2025

(54) VIDEO PLAYBACK METHOD AND DEVICE FOR SETTING A SUBTITLE AND AUDIO LANGUAGE

(71) Applicant: LEMON INC., Grand Cayman (KY)

(72) Inventors: Weiwei Qi, Beijing (CN); Ruie Gao, Beijing (CN); Zhuguang Wang, Culver City, CA (US); Peng Wan, Culver City, CA (US); Tiancheng Yang, Culver City, CA (US); Ryan Rosello, Culver City, CA (US); Conghui Zhu, Los Angeles, CA (US); Yuzhang Du, Beijing (CN); Ye Chen, Beijing (CN); Siqi Tan, Beijing (CN); Wenjia Zhu, Singapore (CN); Ye Lin, Beijing (CN); Xilu Wang, Culver City, CA (US); Yijun Mao, Culver City, CA (US); Yuxuan Zhou, Culver City, CA (US); Donghui Bai, Beijing (CN); Jiangnan Liu, Beijing (CN); Honglei Gao, Beijing (CN); Jicheng Wang, Beijing (CN); Zhe Wang, Beijing (CN); Jiayuan Guo, Singapore (CN)

(73) Assignee: LEMON INC., Grand Cayman (KY)

(*) Notice: Subject to any disclaimer, the term of this patent is extended or adjusted under 35 U.S.C. 154(b) by 0 days.

(21) Appl. No.: 17/725,103

(22) Filed: Apr. 20, 2022

(65) Prior Publication Data
US 2023/0046440 A1    Feb. 16, 2023

(30) Foreign Application Priority Data
Aug. 11, 2021  (CN) .......................... 202110921569.1

(51) Int. Cl.
*H04N 21/485*  (2011.01)
*G06F 3/16*  (2006.01)
*H04N 21/488*  (2011.01)

(52) U.S. Cl.
CPC ......... *H04N 21/4856* (2013.01); *G06F 3/165* (2013.01); *H04N 21/4884* (2013.01)

(58) Field of Classification Search
CPC ............ H04N 21/4856; H04N 21/4884; G06F 3/0488; G06F 3/0482; G06F 9/454; G06F 3/04883; G09B 19/06
See application file for complete search history.

(56) References Cited

U.S. PATENT DOCUMENTS 9,571,870 B1    2/2017  Wilson et al.
11,190,851 B1 * 11/2021  Palaniswami ......... G10L 15/005
(Continued)

FOREIGN PATENT DOCUMENTS

CN  102014256    *  4/2011  ............. H04N 5/278
CN  102014256 A      4/2011
(Continued)

OTHER PUBLICATIONS

YouTube video by username Still Watching Netflix, "How to Choose between Subtitles and Dubbing on Netflix," dated May 17, 2021, downloaded from https://www.youtube.com/watch?v=q-UalJS0X2g (Year: 2021).*

(Continued)

*Primary Examiner* — Eric J Yoon
(74) *Attorney, Agent, or Firm* — Faegre Drinker Biddle & Reath LLP

(57) ABSTRACT

Embodiments of the present disclosure provide a method and device for playing a video. The method comprises: in the process of playing a video, displaying a first subtitle in a subtitle component displayed in a playback interface of the (Continued)

video, and playing a first audio corresponding to the first subtitle; in response to a first trigger operation of a user on the subtitle component, displaying a first pop-up window, the first pop-up window being used to switch display of the first subtitle to the second subtitle; in response to a second trigger operation of the user on the first pop-up window, switching to display the second subtitle in the subtitle component, and playing a second audio corresponding to the second subtitle. The video playback method and device provided by the embodiments of the present disclosure can solve the issues that users cannot understand subtitles and audios in the process of watching videos, thereby improving the users' experience.

18 Claims, 6 Drawing Sheets

(56) References Cited

U.S. PATENT DOCUMENTS

| | | | | |
|---|---|---|---|---|
| 2007/0196795 A1* | 8/2007 | Groff | ............... | G09B 19/00 434/156 |
| 2007/0211168 A1* | 9/2007 | Ko | ............... | H04N 21/8106 348/E5.122 |
| 2009/0178010 A1* | 7/2009 | Chaudhri | ............... | G06F 9/454 704/8 |
| 2011/0163939 A1 | 7/2011 | Tam et al. | | |
| 2020/0099989 A1* | 3/2020 | Niemirska | ......... | H04N 21/8106 |

FOREIGN PATENT DOCUMENTS

| | | | | |
|---|---|---|---|---|
| CN | 103257821 A | | 8/2013 | |
| CN | 112684967 | * | 4/2021 | ............... G06F 3/16 |
| CN | 112860361 A | | 5/2021 | |
| EP | 2629545 A1 | | 8/2013 | |
| EP | 3211882 A1 | | 8/2017 | |
| JP | 10-294896 A | | 4/1997 | |
| JP | 2013168927 A | | 8/2013 | |
| JP | 2018029382 A | | 2/2018 | |
| KR | 20070041187 A | | 4/2007 | |
| KR | 100726439 B1 | | 6/2007 | |
| KR | 2010-0022396 A | | 3/2010 | |
| WO | 2011084950 A2 | | 7/2011 | |
| WO | 2020251122 A1 | | 12/2020 | |

OTHER PUBLICATIONS

Amara.org website, "Subtitles vs Captions: What's the Difference?," published Sep. 5, 2019, downloaded from https://blog.amara.org/2019/09/05/subtitles-vs-captions-what-is-the-difference/ (Year: 2019).*
YouTube video by username TroubleChute, "Change language back to default/English," published Apr. 30, 2021, downloaded from https://www.youtube.com/watch?v=Kh96ZflBGPo (Year: 2021).*
How to Change the Subtitles and Audio Language on Netflix-for All Devices. Jun. 11, 2021, [searched on Mar. 30, 2023 from https://www.radiotimes.com/technology/technology-guides/how-to-change-subtitles-audio-language-netflix-guide/], entire document.
International Search Report mailed Mar. 31, 2023 for International Application No. PCT/SG2022/050498, with English translation.
Extended European Search Report mailed Aug. 26, 2024 in European Application No. 22856330.0.
Office Action for Singapore Application No. 11202400872T, mailed on Dec. 31, 2024, 9 pages.
Written Opinion for International Application No. PCT/SG2022/050498, mailed Mar. 31, 2023, 03 Pages.
First Office Action for Chinese Application No. 202110921569.1, mailed Feb. 23, 2025, 17 pages.
Office action received from Japanese patent application No. 2024-508336 mailed on Mar. 11, 2025, 10 pages (6 pages English Translation and 4 pages Original Copy).
Communication pursuant to Article 94(3) EPC mailed May 22, 2025 in European Applicant No. 22 856 330.0.

* cited by examiner

VIDEO PLAYBACK METHOD AND DEVICE FOR SETTING A SUBTITLE AND AUDIO LANGUAGE

CROSS-REFERENCE TO RELATED APPLICATION

The present application claims priority to P.R.C. patent application No. 202110921569.1, filed Aug. 11, 2021, and entitled "VIDEO PLAYBACK METHOD AND DEVICE", the entirety of which is incorporated herein by reference.

TECHNICAL FIELD

The present disclosure relates to the field of terminals, and in particular, to a video playback method and device.

BACKGROUND

With the development of software development technology, there are more and more categories of application (APP) on mobile terminals. Among them, APPs such as video type are very popular among the public. Users can watch various kinds of videos released by creators through video type APPs. However, in the process of watching videos, there may be issues that users cannot understand subtitles and audios, so that the users' experience is not so good.

SUMMARY

Embodiments of the present disclosure provide a video playback method and device for solving issues that users cannot understand subtitles and audios in the process of watching videos, thereby improving the users' experience.

In a first aspect, an embodiment of the present disclosure provides a video playback method, the method comprising: in the process of playing a video, displaying a first subtitle in a subtitle component displayed in a playback interface of the video, and playing a first audio corresponding to the first subtitle; in response to a first trigger operation of a user on the subtitle component, displaying a first pop-up window, which is used to switch display of the first subtitle to a second subtitle; in response to a second trigger operation of the user on the first popup window, switching to display the second subtitle in the subtitle component, and playing a second audio corresponding to the second subtitle.

In some implementations, the first subtitle and the first audio correspond to a first language, and the second subtitle and the second audio correspond to a second language; the first language is different from the second language.

In some implementations, after switching to display the second subtitle in the subtitle component, the method further comprises: in response to a third trigger operation on the subtitle component, displaying a second pop-up window, which is used to switch display of the second subtitle to the first subtitle; in response to a fourth trigger operation on the second pop-up window, switching to display the first subtitle in the subtitle component, and playing the first audio.

In some implementations, the method further comprises: in response to a fifth trigger operation of the user, displaying an application setting interface, wherein, the application setting interface is used to set a target subtitle and/or a target audio of the video, the target subtitle including the first subtitle; the target audio including the first audio; and, in response to a sixth trigger operation of the user on the application setting interface, in the process of playing the video, controlling the display of the target subtitle and/or the playback of the target audio corresponding to the target subtitle; wherein, the setting of the target audio is associated with the setting of the target subtitle.

In some implementations, the application setting interface comprises at least one of the following control elements: a subtitle display control element used to control whether to display the target subtitle; a dubbing control element used to control whether to play the target audio corresponding to the target subtitle according to the target subtitle.

In some implementations, the dubbing control element is displayed based on an enable setting of the subtitle display control element.

In some implementations, the application setting interface further comprises: a subtitle language control element; the subtitle language control element is used to provide a plurality of languages to be selected and determine a target language corresponding to the target subtitle among the plurality of languages to be selected according to a selection trigger operation of the user.

In some implementations, the target language includes a language corresponding to the first subtitle; displaying the first subtitle in the subtitle component displayed in the playback interface of the video includes: detecting whether the subtitle display control element is enabled; if yes, displaying the first subtitle with the target language in the subtitle component displayed in the playback interface of the video.

In some implementations, the playing the first audio corresponding to the first subtitle includes: detecting whether the dubbing control element is enabled; if yes, playing the first audio corresponding to the target language.

In a second aspect, an embodiment of the present disclosure provides a video playback method, the method comprising: displaying an application setting interface; the application setting interface is used to set a target subtitle and/or a target audio of a video; in response to a trigger operation of a user on the application setting interface, in the process of playing the video, displaying the target subtitle and/or playing the target audio corresponding to the target subtitle; wherein, the setting of the target audio is associated with the setting of the target subtitle.

In some implementations, the application setting interface includes at least one of the following control elements: a subtitle display control element used to control whether to display the target subtitle; a dubbing control element used to control whether to play the target audio corresponding to the target subtitle according to the target subtitle.

In some implementations, the dubbing control element is displayed based on the enablement of the subtitle display control.

In some implementations, the application setting interface further comprises: a subtitle language control; the subtitle language control element is used to provide a plurality of languages to be selected and determine a target language corresponding to the target subtitle among the plurality of languages to be selected according to a selection trigger operation of the user.

In some implementations, in response to a trigger operation of the user on the application setting interface, in the process of playing the video, displaying the target subtitle and playing the target audio corresponding to the target subtitle includes: in response to a selection trigger operation of the user on the subtitle language control, determining a target language among a plurality of languages to be selected; wherein, the target language includes a language for the target subtitle; in response to an enable operation of the user on the subtitle display control, displaying the dubbing control element in the application setting interface; in response to an enable operation of the user on the dubbing control, in the process of playing the video, displaying the target subtitle with the target language, and playing the target audio corresponding to the target language.

In some implementations, the target subtitle includes the first subtitle, the target audio includes a first audio, and the target language includes a language corresponding to the first subtitle and the first audio; the displaying the target subtitle and playing the target audio corresponding to the target subtitle includes: displaying the first subtitle with the target language in the subtitle component displayed in the playback interface of the video, and playing the first audio with the target language.

In some implementations, the method further comprises: in response to a trigger operation of the user on the subtitle component, displaying a first pop-up window, which is used to instruct to switch display of the first subtitle to a second subtitle with a second language; in response to a trigger operation of the user on the first pop-up window, switching to display the second subtitle in the subtitle component, and playing the second audio corresponding to the second language, wherein, the second language is different from the target language.

In some implementations, the method further comprises: after switching to display the second subtitle in the subtitle component, and playing the second audio corresponding to the second language, in response to a touch operation of the user on the subtitle component, displaying a second pop-up window, which is used to switch display of the second subtitle to the first subtitle; in response to a touch operation of the user on the second pop-up window, switching to display the first subtitle in the subtitle component, and playing the first audio corresponding to the first subtitle.

In a third aspect, an embodiment of the present disclosure provides a video playback apparatus, comprising: a display device and a playback device; the display device is used to display a first subtitle in a subtitle component displayed in a playback interface of a video in the process of playing the video; the playback device is used to play a first audio corresponding to the first subtitle; the display device is further used to display a first pop-up window in response to a first trigger operation of a user on the subtitle component, where the first pop-up window is used to switch display of the first subtitle to a second subtitle; the display device is further used to switch to display the second subtitle in the subtitle component in response to a second trigger operation of the user on the first pop-up window; the playback device is further used to play a second audio corresponding to the second subtitle.

In some implementations, the first subtitle and the first audio correspond to a first language, and the second subtitle and the second audio correspond to a second language; the first language is different from the second language.

In some implementations, the display device is further used to display a second popup window in response to a third trigger operation on the subtitle component after switching to display the second subtitle in the subtitle component, the second popup window being used to switch display of the second subtitle to the first subtitle; in response to a fourth trigger operation on the second pop-up window, switch to display the first subtitle in the subtitle component; and the playback device is further used to play the first audio.

In some implementations, the display device is further used to display an application setting interface in response to a fifth trigger operation of the user, wherein, the application setting interface is used to set a target subtitle and/or a target audio of the video, the target subtitle including the first subtitle; the target audio including the first audio; and, in response to a sixth trigger operation of the user on the application setting interface, in the process of video playback, control the display of the target subtitle and/or the playback of the target audio corresponding to the target subtitle.

In some implementations, the application setting interface includes at least one of the following control elements: a subtitle display control element used to control whether to display the target subtitle; a dubbing control element used to control whether to play the target audio corresponding to the target subtitle according to the target subtitle.

In some implementations, the dubbing control element is displayed based on the enable setting of the subtitle display control.

In some implementations, the application setting interface further comprises: a subtitle language control; the subtitle language control element being used to provide a plurality of languages to be selected, and determine a target language corresponding to the target subtitle among the plurality of languages to be selected according to a selection trigger operation of the user.

In some implementations, the target language includes a language corresponding to the first subtitle; the display device is specifically used to detect whether the subtitle display control element is enabled; if yes, displaying the first subtitle with the target language in the subtitle component displayed in the playback interface of the video.

In some implementations, the playback device can be used to detect whether the dubbing control element is enabled; if yes, playing the first audio corresponding to the target language.

In a fourth aspect, an embodiment of the present disclosure provides a video playback apparatus, comprising: a display device and a playback device; the display device is used to display an application setting interface; the application setting interface is used to set a target subtitle and/or a target audio of a video; the display device further is used to display the target subtitle in the process of playing the video in response to a trigger operation of a user on the application setting interface; and/or, the playback device is used to play the target audio corresponding to the target subtitle; wherein, the setting of the target audio is associated with the setting of the target subtitle.

In some implementations, the application setting interface includes at least one of the following control elements: a subtitle display control element used to control whether to display the target subtitle; a dubbing control element used to control whether to play the target audio corresponding to the target subtitle according to the target subtitle.

In some implementations, the dubbing control element is displayed based on the enablement of the subtitle display control.

In some implementations, the application setting interface further comprises: a subtitle language control; the subtitle language control element being used to provide a plurality of languages to be selected and determine a target language corresponding to the target subtitle among the plurality of languages to be selected according to a selection trigger operation of the user.

In some implementations, the display device is specifically used to determine the target language among the plurality of languages to be selected in response to a selection trigger operation of the user on the subtitle language control; wherein, the target language includes the language for the target subtitle; in response to an enable operation of the user on the subtitle display control, display the dubbing control element in the application setting interface; in response to an enable operation of the user on the dubbing control, in the process of playing the video, display the target subtitle with the target language;

The playback device can be used to play the target audio corresponding to the target language.

In some implementations, the target subtitle includes a first subtitle, the target audio includes a first audio, and the target language includes a language corresponding to the first subtitle and the first audio; the display device can be used to display the first subtitle with the target language in the subtitle component displayed in the playback interface of the video; the playing module can be used to play the first audio with the target language.

In some implementations, the display device is further used to display a first pop-up window in response to a trigger operation of the user on the subtitle component, where the first pop-up window is used to instruct to switch display of the first subtitle to a second subtitle with the second language; in response to a trigger operation of the user on the first pop-up window, switch to display the second subtitle in the subtitle component.

The playback device is further used to play a second audio corresponding to the second language, wherein, the second language is different from the target language.

In some implementations, the display device is further used to switch to display the second subtitle in the subtitle component, and display a second popup window in response to a touch operation of the user on the subtitle component after playing the second audio corresponding to the second language, the second pop-up window being used to switch display of the second subtitle to the first subtitle; in response to a touch operation of the user on the second pop-up window, switch to display the first subtitle in the subtitle component.

The playback device is further used to play the first audio corresponding to the first subtitle.

In a fifth aspect, an embodiment of the present disclosure provides a computer-readable storage medium having a computer program stored thereon, which, when executed by a processor, implements the video playback method of any one of the first aspect or the second aspect.

In a sixth aspect, an embodiment of the present disclosure provides a computer program product comprising a computer program, which, when executed by a processor, implements the video playback method of any one of the first aspect or the second aspect.

In a seventh aspect, an embodiment of the present disclosure provides a terminal device, comprising: a processor and a memory; the memory is used to store executable instructions for the processor; the processor is used to execute the executable instructions to implement the video playback method of any one of the first aspect or the second aspect.

Embodiments of the present disclosure provide a method and device for playing a video. The method comprises: in the process of playing a video, displaying a first subtitle in a subtitle component displayed in a playback interface of the video, and playing a first audio corresponding to the first subtitle; in response to a first trigger operation of a user on the subtitle component, displaying a first pop-up window, the first pop-up window being used to switch display of the first subtitle to the second subtitle; in response to a second trigger operation of the user on the first pop-up window, switching to display the second subtitle in the subtitle component, and playing a second audio corresponding to the second subtitle. With the method above, it is possible to switch display between the first subtitle and the second subtitle, and correspondingly, switch between the first audio and the second audio, so as to solve the issues that users cannot understand subtitles and the audios, thereby improving the users' experience.

DETAILED DESCRIPTION

In order to make the object, technical solutions and advantages of the present disclosure more clear, the technical solutions in the present disclosure will be described clearly and completely below with reference to the accompanying drawings in the present disclosure. Obviously, the described embodiments are merely a part, not all, of embodiments of the present disclosure. Based on the embodiments in the present disclosure, all other embodiments obtained by those of ordinary skill in the art without creative efforts shall fall within the protection scope of the present disclosure.

In the present disclosure, it should be explained that the terms "first" and "second" are only used for descriptive purposes, and should not be construed as indicating or implying relative importance. Furthermore, "at least one" means one or more, and "a plurality of" means two or more. "And/or", which describes the association relationship of the associated objects, denotes that there can be three kinds of relationships, for example, A and/or B can denote: only A, both A and B, and only B, where A, B can be singular or plural. The character "/" generally indicates that the associated objects before and after are in an "or" relationship. "At least one of the following" or similar expression thereof refers to any combination of the following items, including a single item or any combination of plural items. For example, at least one of a, b, or c may represent: a alone, b alone, c alone, a combination of a and b, a combination of a and c, a combination of b and c, or a combination of a, b, and c, where a, b, and c can be single or multiple.

In general, when a user watches a video provided by a video application in the prior art, the subtitle displayed on the video and the audio played cannot be adjusted and displayed, for example, displaying a translated subtitle, which would cause the user to have the issue that cannot understand the subtitle and audio in the process of watching the video, making the user's experience not so good.

Figure 1:
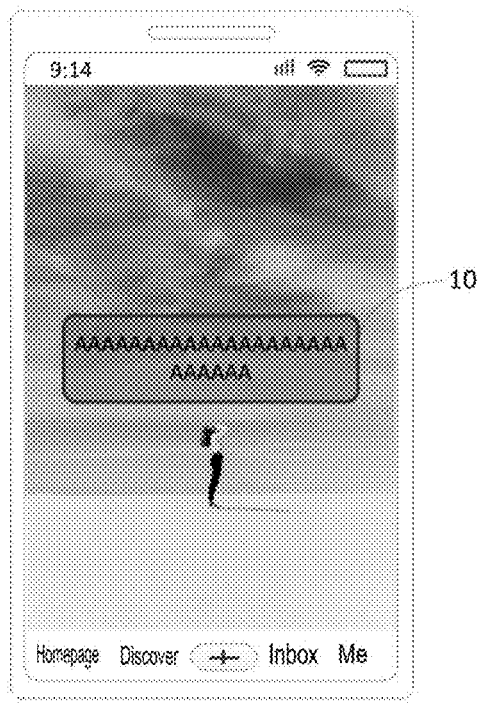
FIG. 1 is an application scenario diagram provided by an embodiment of the present disclosure.

FIG. 1 is an application scenario diagram provided by an embodiment of the present disclosure. The present disclosure relates to a scenario in which a user uses an application (e.g., a video type APP) to watch a video. FIG. 1 is only an example, and does not constitute a limitation to the present disclosure. In the prior art, users cannot adjust subtitles displayed on videos and audios played, for example, displaying translated subtitles or playing translated audios, which may cause the users to have following issues when watching videos: the users cannot understand the subtitles, audios, and affecting users' normal watching of videos, making the users' experience not so good.

To this end, the present disclosure proposes to add a subtitle component 10 in an application grogram, and the subtitle component 10 is presented as a subtitle box or subtitle area on a video playback interface. Subtitles can be displayed in the subtitle component 10 when videos are played through the application. A user can trigger (operation such as click, long press, etc.) the subtitle component 10. After the subtitle component 10 is triggered, a popup window is displayed in an area adjacent to the subtitle component 10. The user can switch display of a first subtitle to a second subtitle or switch display of the second subtitle to the first subtitle through the pop-up window, wherein the first subtitle corresponds to a first language, the second subtitle corresponds to a second language, and the languages for the first subtitle and the second subtitle are different. When display of the first subtitle is switched to the second subtitle, a second audio corresponding to the second subtitle is played, wherein the languages for the second subtitle and the second audio are same, that is, the second audio having the language corresponding to the second subtitle is played. When display of the second subtitle is switched to the first subtitle, a first audio corresponding to the first subtitle is played, wherein the languages for the first subtitle and the first audio are same, that is, the first audio having the language corresponding to the first subtitle is played. According to the embodiments of the present disclosure, the subtitles are displayed and switched to be displayed in different languages, and the audio corresponding to the subtitle language is played and switched accordingly, so that these issues that users cannot understand subtitles and the audios can be solved, which improves the users' experience greatly.

The technical solutions of the present disclosure and how the technical solutions of the present disclosure solve the above technical problems will be described in detail below with specific embodiments. The following several specific embodiments may be combined with each other, and the same or similar concepts or processes may not be repeated in certain embodiments. The embodiments of the present disclosure will be described below with reference to the accompanying drawings.

Figure 2:
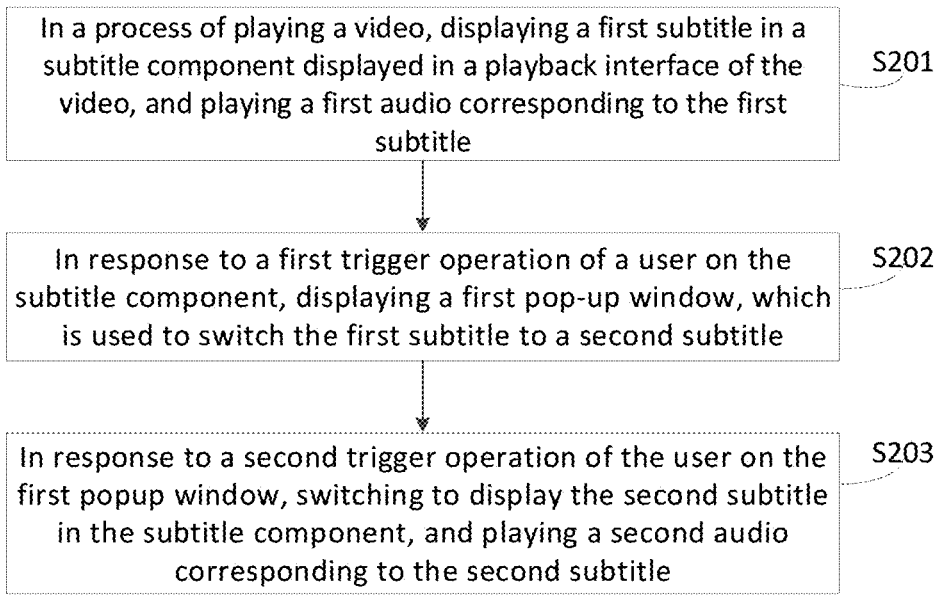
FIG. 2 is a schematic flowchart of a video playback method provided by an embodiment of the present disclosure.

FIG. 2 is a schematic flowchart of a video playback method provided by an embodiment of the present disclosure. As shown in FIG. 2, the method includes the following steps.

In step S201, in a process of playing a video, displaying a first subtitle in a subtitle component displayed in a playback interface of the video, and playing a first audio corresponding to the first subtitle.

Optionally, the executive body of the embodiment of the present disclosure may be a terminal device, or may be a video playback apparatus provided in a terminal device, and the video playback apparatus may be implemented by a combination of software and/or hardware.

The form of the terminal device includes, but is not limited to, a smart phone, a tablet, a notebook, a wearable electronic device, or a smart home device, etc. The present disclosure does not limit the form of the terminal device. Software includes, but is not limited to, the above application.

In the process of playing a video, displaying a first subtitle in a subtitle component displayed in a playback interface of the video, and playing a first audio corresponding to the first subtitle, for example, playing the first audio having the language corresponding to the first subtitle.

In some implementations, the first subtitle and the first audio correspond to a first language. The first audio is a voice audio for the first subtitle.

Optionally, the first language may be a target language determined through a subtitle language control element (e.g., the subtitle language control element in a application setting interface below), for example, the subtitle language that the user expects to be able to read.

Optionally, the first language corresponding to the first subtitle may include languages such as Chinese, English, and Japanese. Specifically, the introduction of displaying the first subtitle in the subtitle component will be described in detail below with reference to a playback interface 30 in FIG. 3.

In step S202, in response to a first trigger operation of a user on the subtitle component, displaying a first pop-up window, which is used to switch the first subtitle to a second subtitle.

The detailed description of the first pop-up window will be described in detail below in conjunction with a playback interface 31 in FIG. 3.

The second subtitle corresponds to a second language, and the second language is different from the first language.

For example, when the first language is the target language (that is, the language the user expects to read), the second language can be the original language of the video; accordingly, the first subtitle is the translated subtitle of the video, and the second subtitle is the original subtitle corresponding to the original language of the video; the first audio is the translated audio of the video, and the second subtitle is the original audio of the video. It should be noted that the first subtitle can be the translated subtitle after a server corresponding to the application has translated the second subtitle, or it can be the translated subtitle that comes with the video, that is, the translated subtitle made by the creator of the video when creating the video.

For example, the first language may be English, and the second language may be Chinese.

In step S203, in response to a second trigger operation of the user on the first popup window, switching to display the second subtitle in the subtitle component, and playing a second audio corresponding to the second subtitle.

In some implementations, in response to the second trigger operation of the user on the first pop-up window, switching to display the second subtitle in the subtitle component, wherein the second subtitle is in the second language, and playing the second audio with the second language, the second audio being a voice audio of the second subtitle.

Further, after displaying the second subtitle in the subtitle component, the method further comprises: in response to a third trigger operation on the subtitle component, displaying a second pop-up window, which is used to switch display of the second subtitle to the first subtitle; in response to a fourth trigger operation on the second pop-up window, switching to display the first subtitle in the subtitle component, and playing the first audio. Wherein, the first audio and the first subtitle correspond to the first language.

In addition, in some implementations, after displaying the second subtitle in the subtitle component, the method further comprises: in response to a third trigger operation on the subtitle component, displaying a second pop-up window, which is used to switch display of the second subtitle to the third subtitle; in response to a fourth trigger operation on the second pop-up window, switching to display the third subtitle in the subtitle component, and playing the third audio, wherein the third audio and the third subtitle correspond to a third language, and the third language is different from first language or second language.

In a video playback method provided in the embodiment of FIG. 2, displaying a first subtitle in a subtitle component displayed on a playback interface, and playing a first audio corresponding to the language of the first subtitle; in response to a first trigger operation of a user on the subtitle component, displaying a first pop-up window; in response to a second trigger operation of the user on the first pop-up window, switching to display a second subtitle in the subtitle component, and playing a second audio corresponding to the language of the second subtitle, as such, it is possible to implement to switch and display between the first subtitle and the second subtitle, and to switch and play between the first audio with the first language and the second audio with the second language, so as to solve the issues that users cannot understand the subtitle and the audios, thereby improving users' experience.

Figure 6:
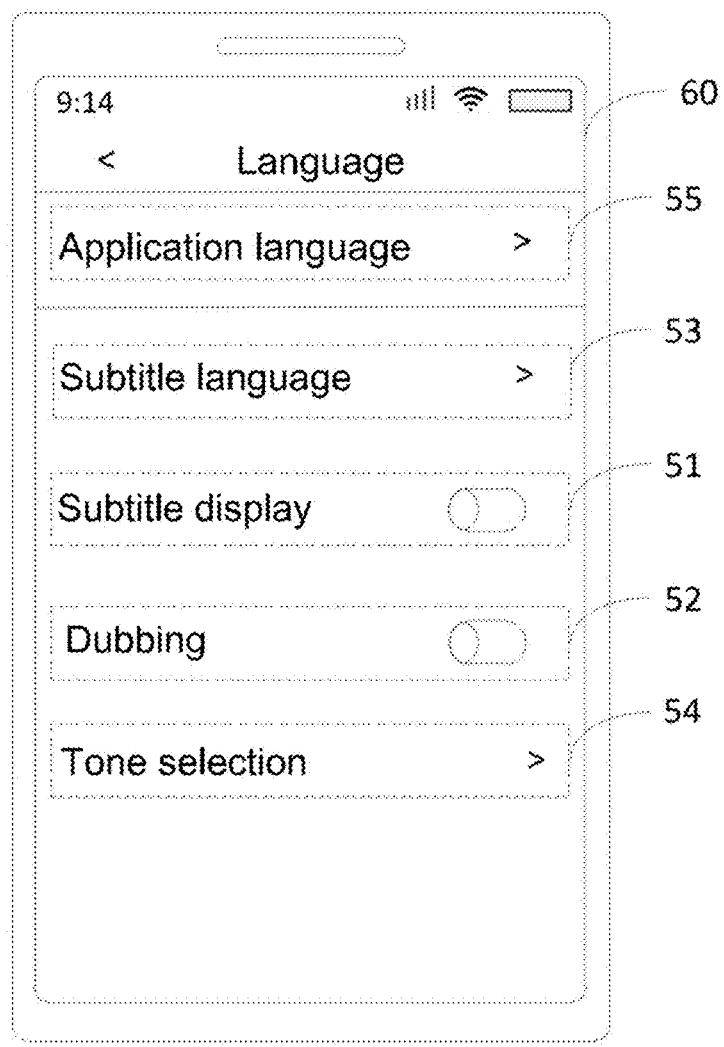
FIG. 6 is a first schematic diagram of an application setting interface provided by an embodiment of the present disclosure.
Figure 7:
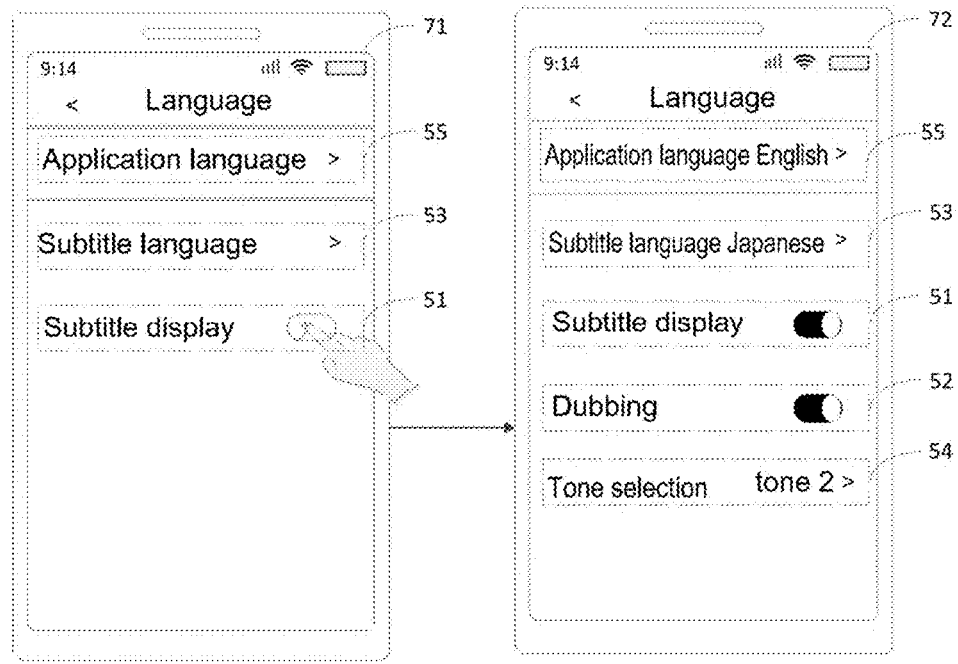
FIG. 7 is a second schematic diagram of an application setting interface provided by an embodiment of the present disclosure.

In some implementations, the above method further comprises: in response to a fifth touch operation of the user, displaying an application setting interface (as shown in FIGS. 6 and 7 below), wherein, the application setting interface is used to set a target subtitle and/or a target audio of the video, the target subtitle including the first subtitle above; the target audio including the first audio above; and in response to a sixth touch operation of the user on the application setting interface, in the process of playing the video, controlling the display of the target subtitle and/or the playback of the target audio corresponding to the target subtitle; wherein, the setting of the target audio is associated with the setting of the target subtitle, for example, the target audio and the target subtitle corresponding to the same language.

In some implementations, the application setting interface comprises at least one of the following control elements: a subtitle display control element used to control whether to display the target subtitle; and a dubbing control element used to control whether to play the target audio corresponding to the target subtitle according to the target subtitle, that is, to play the target audio with the language corresponding to the target subtitle.

In some implementations, the dubbing control element is displayed based on the enable setting of the subtitle display control.

In some implementations, the application setting interface further comprises: a subtitle language control element used to provide a plurality of languages to be selected, and determine a target language corresponding to the target subtitle among the plurality of languages to be selected according to a selection trigger operation of the user.

In the case that the target language includes a language corresponding to the first subtitle, displaying the first subtitle in the subtitle component displayed in the playback interface of the video includes: detecting whether the subtitle display control element is enabled; if yes, displaying the first subtitle with the target language in the subtitle component displayed in the playback interface of the video. The detailed description of the subtitle display control element will be described in detail below with reference to the embodiments of FIGS. 6 and 7.

In some implementations, playing the first audio corresponding to the first subtitle includes: detecting whether the dubbing control element is enabled; if yes, playing the first audio corresponding to the first subtitle, that is, playing the first audio with the language of the first subtitle. The detailed description of the dubbing control element will be described in detail below with reference to the embodiments of FIGS. 6 and 7.

Optionally, FIG. 2 above is a video playback method that can be executed by a terminal device when the subtitle display control element is enabled and the dubbing control element is enabled.

In some implementations, when the dubbing control element is enabled, it can further detect whether the video supports dubbing, and if yes, the first audio corresponding to the first subtitle is played; otherwise, the first audio corresponding to the first subtitle is not played. In some implementations, in the case that the target language includes the language corresponding to the first subtitle, if it is detected that the subtitle display control element is enabled and the dubbing control element is disabled, the first subtitle is displayed in the subtitle component, and the second audio is played.

Further, when the first subtitle is displayed in the subtitle component and the second audio is played, the terminal device displays a third pop-up window in response to a trigger operation of the user on the subtitle component, and the third pop-up window is used to switch the first subtitle to the second subtitle, when the first subtitle corresponds to the target language and the second subtitle corresponds to the original language of the video, the third pop-up window may include a "view original" control, for example; in response to a trigger operation of the user on the "view original" control, switch to display the second subtitle in the subtitle component, and continue to play the second audio.

It should be noted that the third pop-up window is the same as the first pop-up window, of which the description will not be repeated here.

In some implementations, if it is detected that the subtitle display control element is disabled and the dubbing control element is disabled, a second subtitle (for example, the original subtitle corresponding to the original language of the video) is displayed in the subtitle component, and the second audio (for example, the original audio of the video) is played.

In some implementations, a "hide" option may also be included in the pop-up window. In response to a trigger operation of the user on the "hide" option, the subtitle component can be hidden, and the subtitle component is set to be hidden, for example, the hidden subtitle component can be displayed as a subtitle floating window. In addition, in response to a touch operation of the user on the subtitle floating window, the subtitle component further can be resumed to be displayed on the playback interface of the video, and the corresponding subtitle continue to be displayed in the subtitle component.

Figure 3:
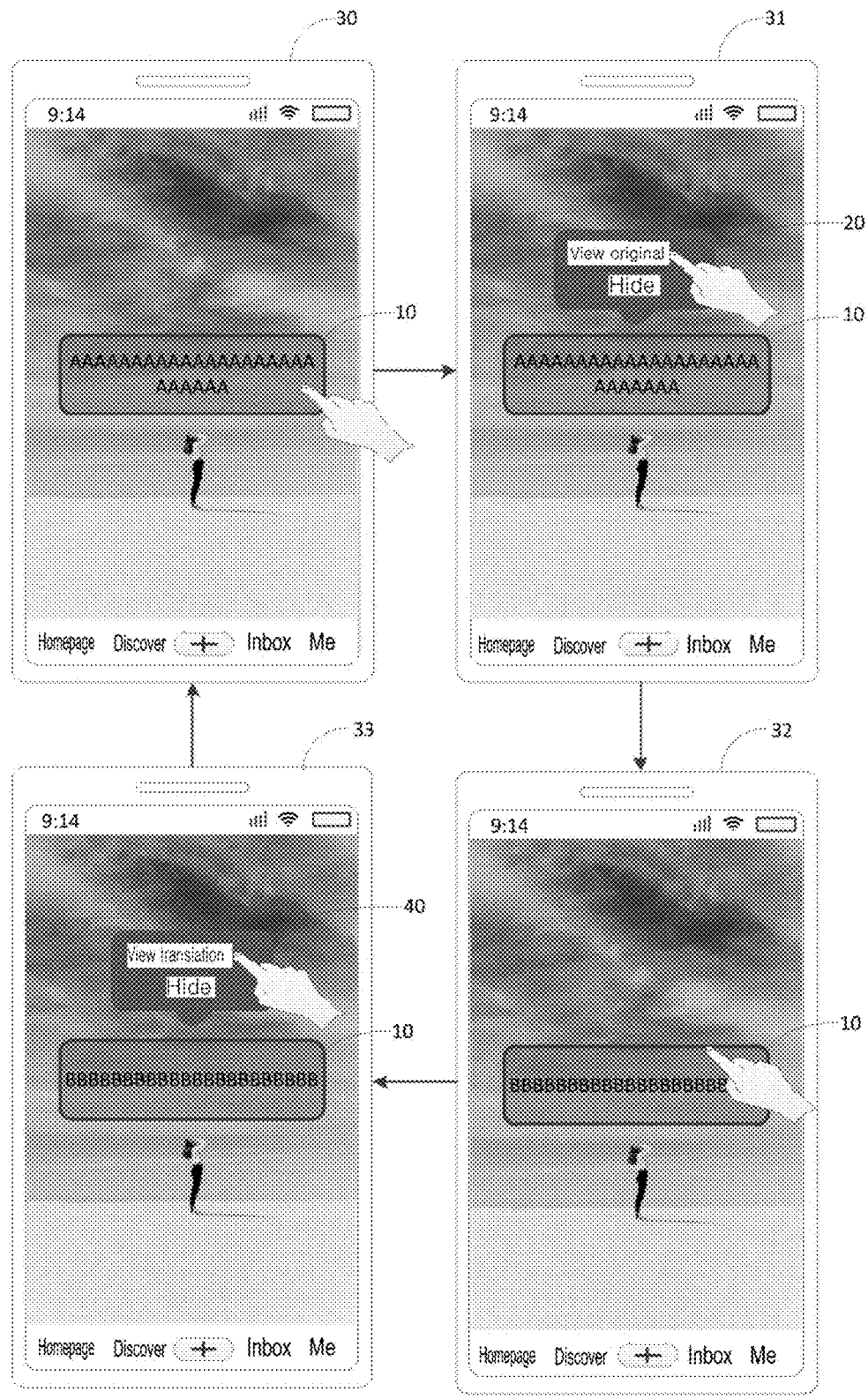
FIG. 3 is a schematic diagram of a playback interface provided by an embodiment of the present disclosure.

FIG. 3 is a schematic diagram of a playback interface provided by an embodiment of the present disclosure. As shown in FIG. 3, playback interfaces 30, 31, 32 and 33 are included. It should be noted that the playback interface shown in FIG. 3 is a display interface when a target subtitle determined according to a subtitle language control element is the language corresponding to a first subtitle, and both a subtitle display control element and a dubbing control element are enabled.

Please refer to the playback interface 30. The playback interface 30 includes a subtitle component 10. The first subtitle is correspondingly displayed in the subtitle component 10, and the language of the first subtitle is a target subtitle determined according to the subtitle language control. A user clicks the subtitle component 10 in the playback interface 30 to input a first trigger operation into a terminal device, and the terminal device displays the playback interface 31 in response to the first trigger operation.

Please refer to the playback Interface 31. A first pop-up window 20 is displayed in the playback interface 31. The first popup window 20 is used to switch display of the first subtitle to the second subtitle. Taking the language of the first subtitle being the language that the user expects to read, the first subtitle being a translated subtitle, and the second subtitle being the original subtitle of the video as an example, the second popup window 20 may include, for example, a "view original" option. The user clicks the "view original" option to input a second trigger operation into the terminal device, and the terminal device displays the playback interface 32 in response to the second trigger operation. Optionally, the first pop-up window 20 may also include a "hide" option. The user can click the "hide" option to hide the subtitle component 10.

Please refer to the playback interface 32. In the playback interface 32, a second subtitle (e.g., the original subtitle of the video) is displayed within the subtitle component 10. The user can click on the subtitle component 10 in the playback interface 32 to input a third trigger operation into the terminal device. The terminal device displays the playback interface 33 in response to the third trigger operation.

Please refer to the playback interface 33. A second pop-up window 40 is displayed in the playback interface 33. The second pop-up window 40 is used to switch display of the second subtitle to the first subtitle. For example, taking the language of the first subtitle being a translated language that the user expects to read and the second subtitle being the original subtitle of the video as an example, the second pop-up window 40 can include a "view translation" component, and the user may click the "view translation" option to input a fourth trigger operation into the terminal device, and the terminal device displays the playback interface 30 in response to the fourth trigger operation. Optionally, the second pop-up window 40 further includes a "hide" option. The user can click the "hide" option to hide the subtitle component 10.

On the basis of the foregoing embodiment, further, before the step S201 in FIG. 2, the video playback method according to the embodiment of the present disclosure can further comprise: in response to a fifth trigger operation of the user, displaying an application setting interface, wherein, the application setting interface is used to set a target subtitle and/or a target audio of the video, the target subtitle including the first subtitle; the target audio including the first audio; and, in response to a sixth trigger operation of the user on the application setting interface, in the process of playing the video, controlling the display of the target subtitle and/or the playback of the target audio corresponding to the target subtitle; wherein, the setting of the target audio is associated with the setting of the target subtitle, for example, the target audio and the target subtitle corresponding to the same language, for example, a target language.

Figure 4:
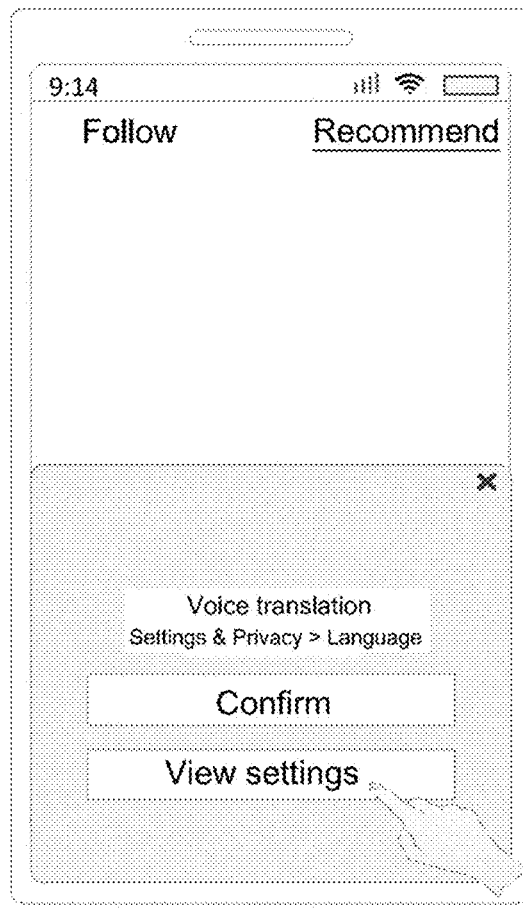
FIG. 4 is a schematic diagram of a guide setting interface provided by an embodiment of the present disclosure.

Optionally, the fifth trigger operation may be a click operation on the control element identified as "me" in the playback interface shown in the embodiment of FIG. 3. The fifth trigger operation may also be a trigger operation on a setting control element included in the guide setting interface, for example, a click operation. Wherein, the guide setting interface may be an interface displayed by the terminal device after detecting that a video is played/a subtitle is displayed and/or an audio is played for the first time. The guide setting interface will be described below with reference to FIG. 4. FIG. 4 is a schematic diagram of a guide setting interface provided by an embodiment of the present disclosure. As shown in FIG. 4, the guide setting interface includes: a setting control element (for example, a "viewing setting" control element). A user can click the setting control element to display the application setting interface.

Optionally, the sixth trigger operation may include a trigger operation on a subtitle display control element 51 and a trigger operation on a dubbing control element 52 in the embodiments below in FIGS. 6 and 7, respectively.

Optionally, the application setting interface includes at least one of the following control elements: a subtitle display control element and a dubbing control element.

The subtitle display control element is used to control whether to display the target subtitle. The dubbing control element is used to control whether to play the target audio corresponding to the target subtitle according to the target subtitle, that is, to play the target audio with the language corresponding to the target subtitle. Optionally, the application setting interface may further include a subtitle language control element. The subtitle language control element is used to provide a plurality of languages to be selected, and to determine the target language corresponding to the target subtitle among the plurality of languages to be selected according to a trigger operation of the user.

Optionally, the application setting interface may further include a tone selection control element. The tone selection control element is used to provide a plurality of tones to be selected, and to determine a target tone among the plurality of tones to be selected according to a trigger operation of the user.

Optionally, the dubbing control element and/or the tone selection control element may be displayed based on the enablement of the subtitle display control element, or may not be displayed based on the enablement of the subtitle display control element.

Illustratively, for example, when the application setting interface includes a subtitle display control element, a dubbing control element, a subtitle language control element, and a tone selection control element, if the dubbing control element and the tone selection control element are not displayed based on the enablement of the subtitle display control element, the application setting interface can be described in combination with the following FIG. 6.

Illustratively, for example, when the application setting interface includes a subtitle display control element, a dubbing control element, a subtitle language control element, and a tone selection control element, if the dubbing control element and the tone selection control element are displayed based on the enablement of the subtitle display control element, the application settings interface can be described in combination with the following FIG. 7.

Figure 5:
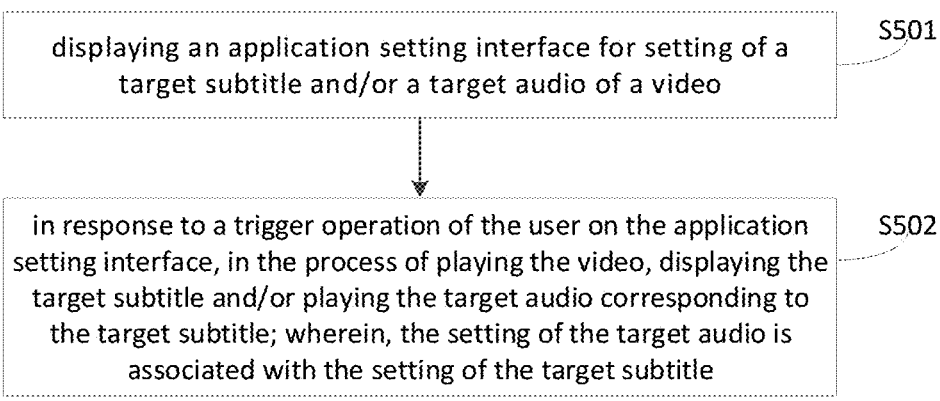
FIG. 5 is a schematic flowchart of another video playback method provided by an embodiment of the present disclosure.

FIG. 5 is a schematic flowchart of another video playback method provided by an embodiment of the present disclosure. As shown in FIG. 5, the method comprises the following steps.

In step S501, displaying an application setting interface, where the application setting interface is used to set a target subtitle and/or a target audio of a video.

Optionally, in response to a fifth trigger operation of a user, displaying the application setting interface. The fifth trigger operation will not be described here.

In some implementations, the target subtitle and the target audio correspond to the same language.

Optionally, for a detailed description of the application setting interface, please refer to the embodiments in FIGS. 6 and 7.

In step S502, in response to a trigger operation of the user on the application setting interface, in the process of playing the video, displaying the target subtitle and/or playing the target audio corresponding to the target subtitle; wherein, the setting of the target audio is associated with the setting of the target subtitle, for example, the target Audio and target subtitle corresponding to the same language.

Optionally, the trigger operation on the application setting interface is similar to the above sixth trigger operation, and details thereof will not be described here again.

In some implementations, S502 may include: in response to a selection trigger operation of the user on the subtitle language control element, determining a target language among a plurality of languages to be selected; wherein, the language for the target subtitle is the target language, and the language of the target audio is also the target language; in response to an enablement operation of the user on the subtitle display control element, displaying the dubbing control element in the application setting interface; in response to an enablement operation of the user on the dubbing control element, in the process of playing the video, displaying the target subtitle with the target language, and playing the target audio corresponding to the target language.

Optionally, the target subtitle includes a first subtitle; the target audio includes the first audio; the first subtitle and the first audio corresponding to a first language. For example, the first language may be the target language (that is, the language the user expects to read), and a second language may be the original language of the video; accordingly, the first subtitle is a translated subtitle of the video, and the second subtitle is the original subtitle corresponding to original language of the video; the first audio is a translated audio of the video, and the second subtitle is the original audio of the video. It should be noted that the first subtitle can be the translated subtitle after a server corresponding to the application has translated the second subtitle, or it can be the translated subtitle that comes with the video, that is, the translated subtitle made by the creator of the video when creating the video.

For example, the target subtitle is the first subtitle, the target audio is the first audio, and both the target subtitle and the target audio correspond to the target language (for example, the target language determined by setting the subtitle language control element), displaying the target subtitle and playing the target audio corresponding to the target subtitle includes: displaying the first subtitle with the target language in the subtitle component displayed in the playback interface of the video, and playing the first audio with the target language. Please refer to the playback interface 30.

Further, the embodiment of FIG. 5 may further comprise: in response to a trigger operation of the user on the subtitle component, displaying a first pop-up window, which is used to instruct to switch display of the first subtitle to the second subtitle; in response to a trigger operation of the user on the first pop-up window, switching to display a second subtitle in the subtitle component, and playing a second audio corresponding to the second subtitle, that is, playing the second audio with a language corresponding to the second subtitle, thereby switching display of the translated subtitle to the original subtitle, and playing the original audio of the video at the same time. Please refer to the playback interface 31.

In some implementations, after displaying the second subtitle in the subtitle component displayed in the playback interface of the video, and playing the second audio corresponding to the second subtitle, the video playback method according to an embodiment of the present disclosure further comprises: in response to a trigger operation of the user on the subtitle component, displaying a second pop-up window; the second pop-up window is used to switch display of a second subtitle to a first subtitle; in response to a trigger operation of the user on the second pop-up window, switching to display the first subtitle in the subtitle component, and playing a first audio corresponding to the first subtitle, that is, playing the first audio with a language corresponding to the first subtitle, so as to switch display of the original subtitle to a translated subtitle and play a translated audio of the video at the same time. For a detailed description of the interface including the second pop-up window, please refer to the playback interface 33.

The embodiment of FIG. 5 provides another video processing method comprising: displaying an application setting interface; the application setting interface is used to set a target subtitle and/or a target audio of a video, and in response to a trigger operation of the user on the application setting interface, in the process of playing the video, displaying the target subtitle and/or playing the target audio corresponding to the target subtitle; wherein, the setting of the target audio is associated with the setting of the target subtitle. In the above method, the user sets the target subtitle and/or the target audio of the video through the application setting interface, the target subtitle can be a subtitle that the user expects to read, and the target audio can be an audio that the user can understand, thus, the issue that the user cannot understand the subtitle and audio is solved, thereby improving the user's experience.

FIG. 6 is a first schematic diagram of an application setting interface provided by an embodiment of the present disclosure. As shown in FIG. 6, for example, the application setting interface 60 includes: a subtitle display control element 51, a dubbing control element 52, a subtitle language control element 53, and a tone selection control element 54. Optionally, the application setting interface 50 may further include an application language control element 55. The application language control element 55 is used to control the display language of the application. For example, when the display language of the application is controlled by the application language control element 55 to be Chinese, in the embodiment of FIG. 3, control elements such as "Homepage", "Discover", "Inbox", and "Me" in Chinese are displayed. When the display language of the application is controlled by the application language control element 55 to be English, in the embodiment of FIG. 3, control elements such as "Home", "Discover", "Inbox", and "Me in English can be displayed.

FIG. 7 is a second schematic diagram of an application setting interface provided by an embodiment of the present disclosure. As shown in FIG. 7, it includes: application setting interfaces 71 and 72.

Please refer to the application settings interface 71. The application setting interface 71 includes: a subtitle display control element 51 and a subtitle language control element 53. Optionally, the application setting interface 71 may further include an application language control element 55. The user can click on the subtitle display control element 51 to input an enablement operation on the subtitle display control element 51 into the terminal device, and the terminal device displays the application setting interface 72 in response to the enablement operation on the subtitle display control element 51.

Pleases refer to the application settings interface 72. A tone selection control element 54 and a dubbing control element 52 are shown in the application settings interface 72.

On the basis of FIGS. 6 and 7, the user can perform an enablement or disablement operation on the subtitle display control element 51, an enablement or disablement operation on the dubbing control element 52, a selection trigger operation on the subtitle language control element 53, and a selection trigger operation on the tone selection control element 54, and a selection trigger operation on the application language control element 55, so that the user can flexibly switch display of a first subtitle to a second subtitle, or switch display of the second subtitle to the first subtitle, thereby realizing the switching and displaying between the translated subtitle and the original text, and accordingly, the first audio played is switched to the second audio, and display of the second audio is switched to the first audio, so as to realize the switching between the translated audio and the original audio, and improve the user's watching experience.

For example, the user performs an enablement operation on the subtitle display control element 51 to control the subtitle display control element 51 to be enabled, and the user performs a disablement operation on the subtitle display control element 51 to control the subtitle display control element 51 to be disabled. On the basis of FIG. 7, when the subtitle display control element 51 is enabled, the dubbing control element 52 can be displayed in an application configuration interface, and the user can further control the dubbing control element 52 to be enabled or disabled, so as to play the target audio corresponding to the target subtitle language in the process of playing the video accordingly.

It should be noted that, for example, in FIG. 7, a selection trigger operation is performed on the subtitle language control element 53 to set a target language, for example, the target language is set to Japanese, so that the target subtitle is set to a subtitle corresponding to Japanese (i.e., the first subtitle); an enablement operation is performed on the dubbing control element 52, thereby the target audio is set to an audio corresponding to Japanese (i.e., the first audio) accordingly.

Figure 8:
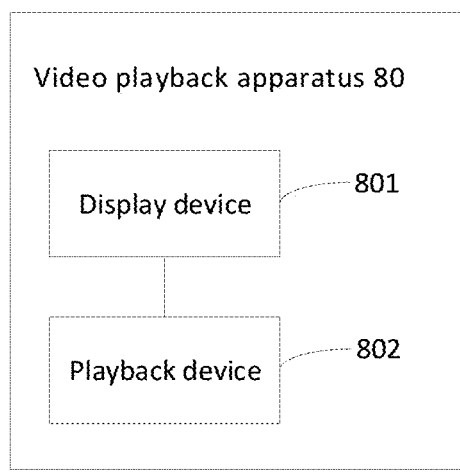
FIG. 8 is a schematic structural diagram of a video playback apparatus provided by an embodiment of the present disclosure.

FIG. 8 is a schematic structural diagram of a video playback apparatus provided by an embodiment of the present disclosure. As shown in FIG. 8, the video playback apparatus 80 includes: a display device 801 and a playback device 802; the display device 801 is used to display a first subtitle in a subtitle component displayed in a playback interface of a video in the process of playing the video; the playback device 802 is used to play a first audio corresponding to the first subtitle; the display device 801 is further used to display a first pop-up window in response to a first trigger operation of a user on the subtitle component, the first pop-up window being used to switch display of the first subtitle to a second subtitle; the display device 801 is further used to switch to display the second subtitle in the subtitle component in response to a second trigger operation of the user on the first pop-up window; the playback device 802 is further used to play a second audio corresponding the second subtitle.

The video playback apparatus 80 provided in this embodiment can be used to perform the steps in any of the above method embodiments, and the implementation principles and technical effects thereof are similar, and details will not be repeated here again.

In some implementations, the first subtitle and the first audio correspond to a first language, and the second subtitle and the second audio correspond to a second language; the first language is different from the second language.

In some implementations, the display device 801 may be further used to display a second pop-up window in response to a third trigger operation on the subtitle component after switching to display the second subtitle in the subtitle component, and the second pop-up window is used to switch display of the second subtitle to the first subtitle; and switch to display the first subtitle in the subtitle component in response to a fourth trigger operation on the second pop-up window.

The playback device 802 can further be used to play the first audio.

In some implementations, the display device 801 may be further used to display an application setting interface in response to a fifth trigger operation of the user, wherein, the application setting interface is used to set a target subtitle and/or a target audio of a video, and the target subtitle includes a first subtitle; the target audio includes a first audio; and, in response to a sixth trigger operation of the user on the application setting interface, in the process of playing the video, control the display of the target subtitle and/or the playback of the target audio corresponding to the target subtitle.

In some implementations, the application setting interface includes at least one of the following control elements: a subtitle display control element used to control whether to display the target subtitle; and a dubbing control element used to control whether to play the target audio corresponding to the target subtitle according to the target subtitle.

In some implementations, the dubbing control element is displayed based on the enable setting of the subtitle display control element.

In some implementations, the application setting interface further comprises: a subtitle language control element; the subtitle language control element being used to provide a plurality of languages to be selected and determine a target language corresponding to the target subtitle among the plurality of languages to be selected according to a selection trigger operation of the user.

In some implementations, the target language includes the language corresponding to the first subtitle; the display device 801 can be used to detect whether the subtitle display control element is enabled; if yes, display the first subtitle with the target language in the subtitle component displayed in the playback interface of the video.

In some implementations, the playback device 802 can be used to detect whether the dubbing control element is enabled; if yes, play the first audio corresponding to the target language.

The video playback device 80 provided in this embodiment can be used to execute the steps in any of the above method embodiments, and the implementation principles and technical effects thereof are similar, and details will not be repeated here again.

Figure 9:
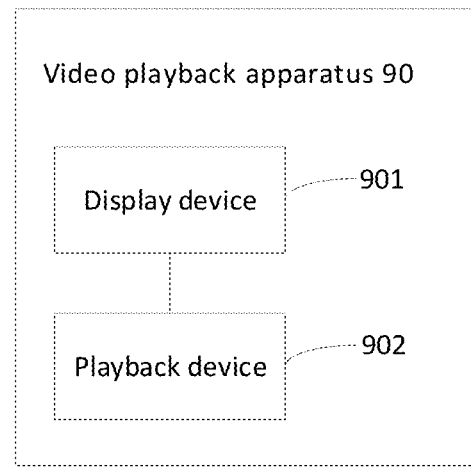
FIG. 9 is a schematic structural diagram of another video playback apparatus provided by an embodiment of the present disclosure.

FIG. 9 is a schematic structural diagram of another video playback apparatus provided by an embodiment of the present disclosure. As shown in FIG. 9, the video playback apparatus 90 includes: a display device 901 and a playback device 902; the display device 901 is used to display an application setting interface; the application setting interface is used to set a target subtitle and/or a target audio of a video; the display device 901 is further used to display the target subtitle in the process of playing the video in response to a trigger operation of a user on the application setting interface; and/or, the playback device 902 is used to play the target audio corresponding to the target subtitle; wherein, the setting of the target audio is associated with the setting of the target subtitle.

The video playback apparatus 90 provided in this embodiment can be used to execute the steps in any of the above method embodiments, and the implementation principles and technical effects thereof are similar, and details will not be repeated here again.

In some implementations, the application setting interface includes at least one of the following control elements: a subtitle display control element used to control whether to display the target subtitle; and a dubbing control element used to control whether to play a target audio corresponding to the target subtitle according to the target subtitle.

In some implementations, the dubbing control element is displayed based on the enablement of the subtitle display control element.

In some implementations, the application setting interface further comprises: a subtitle language control element; the subtitle language control element being used to provide a plurality of languages to be selected and determine a target language corresponding to the target subtitle among the plurality of languages to be selected according to a selection trigger operation of the user.

In some implementations, the display device 901 can be used to determine the target language among the plurality of languages to be selected in response to a selection trigger operation of the user on the subtitle language control element; wherein, the target language includes the language for the target subtitle; in response to an enable operation of the user on the subtitle display control element, display the dubbing control element in the application setting interface; in response to an enable operation of the user on the dubbing control element, in the process of playing the video, display the target subtitle with the target language;

The playback device 902 can be used to play the target audio corresponding to the target language.

In some implementations, the target subtitle includes a first subtitle, the target audio includes a first audio, and the target language includes a language corresponding to the first subtitle and the first audio; the display device 901 can be used to display the first subtitle with the target language in the subtitle component displayed in the playback interface of the video; the playing module 902 can be used to play the first audio with the target language.

In some implementations, the display device 901 can further be used to display a first pop-up window in response to a trigger operation of the user on the subtitle component, where the first pop-up window is used to instruct to switch display of the first subtitle to a second subtitle with the second language; in response to a trigger operation of the user on the first pop-up window, switch to display the second subtitle in the subtitle component; the playback device 902 can further be used to play a second audio corresponding to the second language, wherein the second language is different from the target language.

In some implementations, the display device 901 can further be used to display a second pop-up window in response to a touch operation of the user on the subtitle component after switching to display the second subtitle in the subtitle component, and playing the second audio corresponding to the second language, the second pop-up window being used to switch display of the second subtitle to the first subtitle; in response to a touch operation of the user on the second pop-up window, switch to display the first subtitle in the subtitle component; the playback device 902 can be used to play the first audio corresponding to the first subtitle.

The video playback apparatus 90 provided in this embodiment can be used to execute the steps in any of the above method embodiments, and the implementation principles and technical effects thereof are similar, and details will not be repeated here again.

Figure 10:
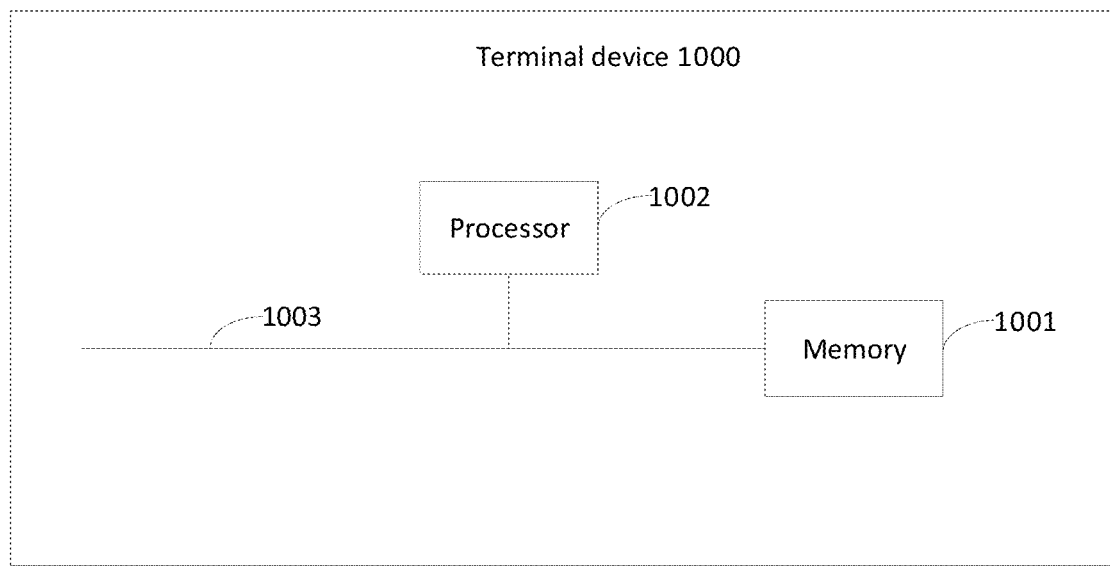
FIG. 10 is a hardware structural diagram of a terminal device provided by an embodiment of the present disclosure.

FIG. 10 is a hardware structural diagram of a terminal device provided by an embodiment of the present application. As shown in FIG. 10, the terminal device 1000 includes: a processor 1001 and a memory 1002; the memory 1001 is used to store executable instructions for the processor; the processor 1002 is used to execute the executable instructions to implement the video playback method in any of the above method embodiments. The processor 1001 and the memory 1002 are connected via a bus 1003.

An embodiment of the present disclosure provides a computer-readable storage medium having a computer program stored thereon, which, when executed by a processor, implements the video playback method in any of the above method embodiments.

An embodiment of the present disclosure provides a computer program product comprising a computer program, which, when executed by a processor, implements the video playback method in any of the above method embodiments.

In the several embodiments provided in the present disclosure, it should be understood that the disclosed apparatus and method can be implemented in other manners. For example, the apparatus embodiments described above are only illustrative. For example, the division of units is only a logical function division. In actual implementation, there may be other division methods, for example, multiple units or components may be combined or integrated into another system, or some features can be ignored, or not executed. On the other hand, the mutual coupling or direct coupling or communication connection as shown or discussed may be indirect coupling or communication connection via some interfaces, apparatus or units, and may be in electrical, mechanical or other forms.

Units described as separate components may or may not be physically separated, and components shown as units may or may not be physical units, that is, may be located in one place, or may be distributed across multiple network units. Some or all of the units may be selected according to actual needs to achieve the purposes of the solution in this embodiment.

In addition, each functional unit in each embodiment of the present disclosure may be integrated into one processing unit, or each unit may exist physically alone, or two or more units may be integrated into one unit. The above integrated unit may be implemented in the form of hardware, or may be implemented in the form of hardware plus software functional units.

The above integrated units implemented in the form of software functional units can be stored in a computer-readable storage medium. The above software functional unit is stored in a storage medium, and includes several instructions to enable a computer device (which may be a personal computer, a server, or a network device, etc.) or a processor to execute some steps of the various method embodiments of the present disclosure. The above storage medium includes various media such as: U disk, movable hard disk, Read-Only Memory (ROM), Random Access Memory (RAM), magnetic disc or optical disk, etc., that can store program code.

It should be understood that the processor described in the present disclosure may be a Central Processing Unit (CPU), and may also be other general-purpose processor, Digital Signal Processor (DSP), Application Specific Integrated Circuit (ASIC) and so on. A general purpose processor may be a microprocessor or the processor may be any conventional processor or the like. The steps of the method disclosed in conjunction with the present disclosure can be directly embodied as executed by a hardware processor, or executed by a combination of hardware and software modules in the processor.

Finally, it should be noted that the above embodiments are only used to illustrate the technical solutions of the present disclosure, but not to limit thereof; although the present disclosure has been described in detail with reference to the foregoing embodiments, those of ordinary skill in the art should understand that the technical solutions recited in the foregoing embodiments can still be modified, or some or all of the technical features thereof can be equivalently replaced; while these modifications or replacements do not make the essence of corresponding technical solutions deviate from the scope of technical solutions of the embodiments of the present disclosure.

What is claimed is:

1. A video playback method comprising:
in a process of playing a video, displaying a first subtitle in a first language in a subtitle component displayed in a playback interface of the video, and playing a first audio in the first language corresponding to the first subtitle;
in response to a first trigger operation of a user on the subtitle component, displaying a first pop-up window, which is used to switch display of the first subtitle to a second subtitle in a second language; and
in response to a second trigger operation of the user on the first pop-up window to switch display of the first subtitle to the second subtitle, switching to display the second subtitle in the subtitle component,
wherein the method further comprises:
in response to a third trigger operation of the user, displaying an application setting interface, the application setting interface comprising a dubbing control element that is selectively enabled by the user and wherein the enabling of the dubbing control element causes automatic switching of a dubbing language to be the same language as a currently displayed subtitle language without requiring the user to identify a specific dubbing language;
detecting whether the dubbing control element is enabled; and
based on the detected enabling of the dubbing control element, the second trigger operation and the switching to display the second subtitle, performing the automatic switching such that the second audio is played in the second language along with the second subtitle automatically.

2. The method according to claim 1, wherein
after switching to display the second subtitle in the subtitle component, the method further comprises:
in response to a fourth trigger operation on the subtitle component, displaying a second pop-up window, which is used to switch display of the second subtitle to the first subtitle, and
in response to a fifth trigger operation on the second pop-up window to switch display of the second subtitle to the first subtitle, switching to display the first subtitle in the subtitle component, and playing the first audio in the first language along with the first subtitle automatically if the dubbing control element is enabled.

3. The method according to claim 1, wherein, the method further comprises:
the application setting interface further comprises a subtitle language control element for setting of a target subtitle, the target subtitle including the first subtitle; and
in response to a sixth trigger operation of the user on the application setting interface, in the process of playing the video, displaying the target subtitle, and playing a target audio in the same language as the target subtitle along with the target subtitle automatically if the dubbing control element is enabled.

4. The method according to claim 3, wherein the application setting interface comprises at least one of the following control elements:
a subtitle display control element used to control whether to display the target subtitle.

5. The method according to claim 4, wherein the dubbing control element is displayed based on an enable setting of the subtitle display control element.

6. The method according to claim 3, wherein
the subtitle language control element is used to provide a plurality of languages to be selected, and determine a target language corresponding to the target subtitle among the plurality of languages to be selected according to a selection trigger operation of the user.

7. The method according to claim 6, wherein the target language includes the first language corresponding to the first subtitle, the displaying the first subtitle in the subtitle component displayed in the playback interface of the video includes:
detecting whether the subtitle display control element is enabled; and
if the subtitle display control element is enabled, displaying the first subtitle in the target language in the subtitle component displayed in the playback interface of the video.

8. A non-transitory computer-readable storage medium having a computer program stored thereon which, when executed by a processor, implements the video playback method according to claim 1.

9. A terminal device comprising: a processor and a memory, wherein
the memory is used to store executable instructions for the processor; and
the processor is used to execute the executable instructions to implement the video playback method according to claim 1.

10. The method according to claim 1, the application setting interface further comprises a tone selection control element to provide a plurality of tones to be selected, and to determine a target tone among the plurality of tones to be selected according to a selection trigger operation of the user.

11. A video playback method comprising:
- in a process of playing a video, displaying a target subtitle in a first language in a playback interface of the video, and playing a target audio in the first language corresponding to the target subtitle;
- in response to a trigger operation of a user on the playback interface, switching display of the target subtitle to a second subtitle in a second language that is different from the first language;
- displaying an application setting interface for setting of a second audio of the video, wherein the application setting interface includes a dubbing control element that is selectively enabled by the user and wherein the enabling of the dubbing control element causes automatic switching of a dubbing language to be the same language as a currently displayed subtitle language without requiring the user to identify a specific dubbing language; and
- based on the trigger operation and the switching display of the target subtitle to the second subtitle and in response to the enabling operation of the user on the dubbing control element in the process of playing the video, performing the automatic switching such that the second subtitle is displayed and concurrently the second audio is automatically played in the second language.

12. The method according to claim 11, wherein the application setting interface includes:
- a subtitle display control element used to control whether to display the target subtitle.

13. The method according to claim 12, wherein the dubbing control element is displayed based on enablement of the subtitle display control element.

14. The method according to claim 12, wherein the application setting interface further comprises: a subtitle language control element,
- wherein the subtitle language control element is used to provide a plurality of languages to be selected and determine a target language corresponding to the target subtitle among the plurality of languages to be selected according to a selection trigger operation of the user.

15. The method according to claim 11 further comprising:
- in response to a trigger operation of the user on a subtitle component where the target subtitle is displayed, displaying a first pop-up window, which is used to instruct to switch display of the target subtitle to the second subtitle in the second language; and
- in response to a trigger operation of the user on the first pop-up window to switch display of the target subtitle to the second subtitle, switching to display the second subtitle in the subtitle component, and play the second audio in the second language along with the second subtitle automatically if the dubbing control element is enabled,
- wherein, the second language is different from a target language of the target subtitle.

16. The method according to claim 15, wherein:
- after switching to display the second subtitle in the subtitle component and play the second audio in the second language, the method further comprises:
- in response to a touch operation of the user on the subtitle component, displaying a second pop-up window, which is used to switch display of the second subtitle to the target subtitle; and
- in response to a touch operation of the user on the second pop-up window to switch display of the second subtitle to the target subtitle, switching to display the target subtitle in the subtitle component, and playing the target audio in the same language with the target subtitle along with the target subtitle automatically.

17. A non-transitory computer-readable storage medium having a computer program stored thereon which, when executed by a processor, implements the video playback method according to claim 11.

18. A terminal device comprising: a processor and a memory, wherein
- the memory is used to store executable instructions for the processor; and
- the processor is used to execute the executable instructions to implement the video playback method according to claim 11.

* * * * *